United States Patent [19]

Saneshige et al.

[11] Patent Number: 5,145,266
[45] Date of Patent: Sep. 8, 1992

[54] BEARING APPARATUS

[75] Inventors: Ryoji Saneshige; Shigeru Ootsuka, both of Yonago, Japan

[73] Assignee: Matsushita Electric Industrial Co., Ltd., Kadoma, Japan

[21] Appl. No.: 730,179

[22] Filed: Jul. 16, 1991

[30] Foreign Application Priority Data

Jul. 17, 1990 [JP] Japan ................... 2-188959

[51] Int. Cl.5 ................... F16C 33/10; F16C 33/74
[52] U.S. Cl. .................. 384/322; 384/132; 384/279
[58] Field of Search .................. 384/130-132, 384/279, 286, 322, 397, 415, 902

[56] References Cited

U.S. PATENT DOCUMENTS

| 2,571,868 | 10/1951 | Haller | 384/279 |
| 2,964,363 | 12/1960 | Daykin et al. | 384/279 |
| 3,626,221 | 12/1971 | Anderson et al. | 384/132 X |
| 3,953,089 | 4/1976 | Dainin | 384/291 |
| 4,693,617 | 9/1987 | Roemer et al. | 384/286 X |
| 4,825,114 | 4/1989 | Ohtsuka et al. | 310/90 |
| 4,910,788 | 3/1990 | Shimizu | 384/192 |

FOREIGN PATENT DOCUMENTS 61-23893 2/1986 Japan .

Primary Examiner—Thomas R. Hannon
Attorney, Agent, or Firm—Cushman, Darby & Cushman

[57] ABSTRACT

In a bearing apparatus having an oilless bearing, plural grooves are formed on an outer surface of the bearing or an inner surface of a bearing holder for holding lubricant oil which is overflowed from the bearing, thereby the lubricant is maintained in a long service.

2 Claims, 3 Drawing Sheets

BEARING APPARATUS

BACKGROUND OF THE INVENTION

1. Field of the Invention

The present invention relates to an improvement of a bearing apparatus which is to be used for bearing a rotation shaft of, for example, a rotor of an electric motor.

2. Description of the Prior Art

A conventional bearing apparatus used in an electric motor is described referring to FIG. 4. FIG. 4 shows only the part of the conventional oilless bearing of an electric motor. A rotor and a stator of the motor are not shown in the figure for the purpose of simplifying the explanation.

In FIG. 4, a rotation shaft 1 of a rotor 8 of the motor (not shown in the figure) is rotatably born by oilless bearings 2 made of sintered oilless metal. In the vicinity of an end 1a of the shaft 1 (lower part in the figure), a washer 3 is provided for receiving a thrust load of the shaft 1 by sliding on a thrust bearing surface 2a of the oilless bearing 2. A stopper 4 is provided on the shaft 1 for making the washer 3 contact the thrust bearing surface 2a of the bearing 2, stably. The oilless bearings metals 2 are supported by a bearing holder 5 which is made of an insulative material. A sealing cap 6, which is for sealing lubricant oil so as not to leak out of the bearing holder 5, is provided on an opening 5a of the bearing holder 5. An oil thrower 7 is provided on another end 1b of the shaft 1 for pushing back flow of the lubricant oil from the oilless bearings 2.

Operation of the above-mentioned conventional bearing apparatus is described.

At first, when the shaft 1 is rotated, outer surface 1c of the shaft 1 slides on an inner bearing surface 2b of the oilless bearings 2. And thereby, temperature of the oilless bearings 2 is increased by friction heat due to the sliding of the shaft 1 on the inner bearing surface 2b of the oilless bearings 2. Next, the lubricant oil impregnated in the oilless bearings 2 is expanded and the viscosity of the lubricant oil is decreased by the friction heat. As a result, the lubricant oil gushes on the inner bearing surface 2b of the oilless bearings 2. The rotation of the shaft 1 is lubricated by the gushed lubricant oil so as to decrease the friction resistance between the shaft 1 and the oilless bearings 2 to a low level, so as to avoid direct contact between the metallic materials of the shaft 1 and the oilless bearings 2. Thus, the wear of the shaft 1 and/or the oilless bearing 2 is decreased, thereby to maintain the property of the oilless bearings 2 in a long service.

When the above-mentioned conventional bearing apparatus, however is used in an enviroment at a high temperature, the lubricant oil further expands and the viscosity of the lubricant oil is further decreased. Thereby, the lubricant oil which can not be held by the oilless bearings 2 overflows to the spaces in the vicinity of the oil thrower 7 and the sealing cap 6 in the bearing holder 5. The lubricant oil having overflowed in the space in the vicinity of the sealing cap 6 does not leak out from the bearing holder 5, since the sealing cap 6 serves as a leak-prevention member against the opening 5a of the bearing holder 5. The inner pressure of the bearing holder 5, however, increases because of the leak-prevention function of the sealing cap 6. Thereby the inner pressure of the oil pushes the lubricant oil having stayed in the space in the vicinity of the oil thrower 7 to the outside of the bearing holder 5. By such an increase of the inner pressure, the lubricant oil overflows from the bearing holder 5 to the outside thereof, and thereby the service life of the oilless bearings 2 is shortened.

Generally, the electric motor repeats the revolving and the stop. The oil thrower 7 serves for pushing back the flow of the lubricant oil to the oilless bearings 2 during the rotation of the rotation shaft 1. However, when the rotation shaft 1 stops its rotation, the oil thrower 7 does not serve the prevention of the leak out of the lubricant oil at all. Accordingly, the lubricant oil, except at a part which is held by the surface of the oilless bearings 2 by surface tension, leaks out from the bearing holder 5. And thereby the service life of the oilless bearings 2 is shortened.

SUMMARY OF THE INVENTION

Purpose of the present invention is to provide an improved bearing apparatus to be used in an electric motor having a longer service the without seize of the oilless bearing.

A bearing apparatus in accordance with the present invention comprises:

a rotation shaft of a rotor;

a cylindrical bearing holder made of insulative material;

at least one oilless bearing for bearing the rotation shaft, having plural grooves on outer periphery in a direction parallel to the rotation shaft for holding lubricant oil impregnated in the oilless bearing by surface tension;

an oil thrower mounted on the rotation shaft facing to the rotor; and a sealing cap closely fixed on an opening of the bearing holder which is opposite to the oil thrower for sealing the lubricant oil in a manner not to leak out from the bearing holder.

By such a constitution, when the lubricant oil impregnated in the oilless bearing is expanded and the viscosity of the lubricant oil is decreased by friction heating or temperature of the environment, much larger amount of the lubricant oil is held by the grooves of the oilless bearing by surface tension than that of the conventional bearing.

While the novel features of the invention are set forth particularly in the apended claims, the invention, both as to organization and content, will be better understood and apreciated, along with other objects and features thereof, from the following detailed description taken in conjuction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
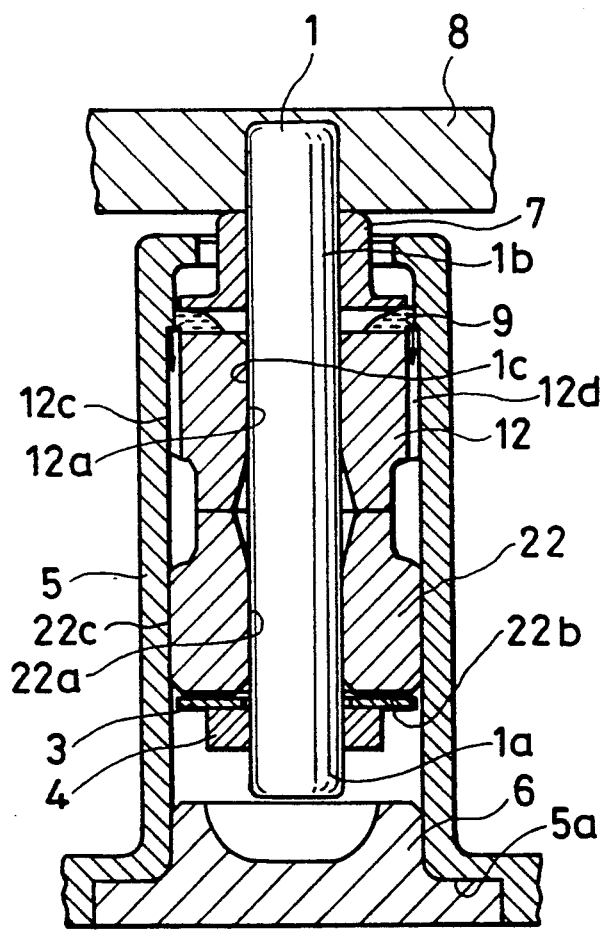
FIG. 1 is a cross-sectional side view showing a preferred embodiment of a bearing apparatus in accordance with the present invention.
Figure 2:
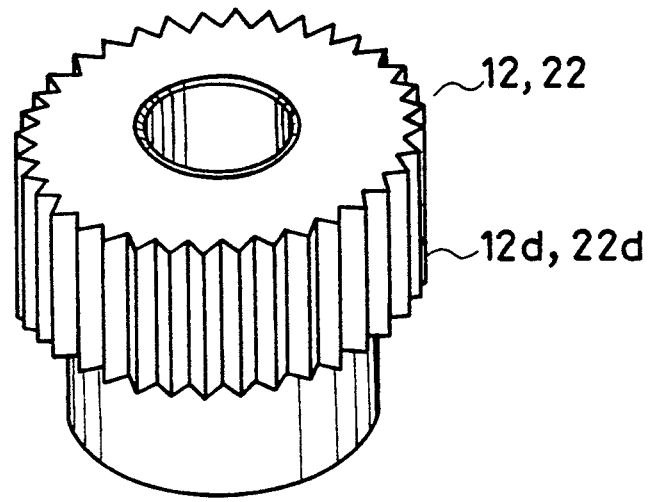
FIG. 2 is a perspective view showing an oilless bearing having plural grooves on its outer surface in a first embodiment of the bearing apparatus in accordance with the present invention.

A preferred embodiment of a bearing apparatus in accordance with the present invention is described referring to FIGS. 1 and 2. FIG. 1 is a cross-sectional side view showing a bearing apparatus in accordance with the present invention. FIG. 2 is a perspective view showing an oilless bearing 12 (or 22).

In FIG. 1, a rotation shaft 1 which is, for example, a shaft of a rotors of an electric motor is rotatably born by oilless bearings 12 and 22 which are made of sintered oilless metal. In the vicinity of an end 1a of the shaft 1 (lower part in the figure), a washer 3 is provided for receiving a thrust load of the shaft 1 by sliding on a thrust bearing surface 22b of the oilless bearing 22. A stopper 4 is provided on the shaft 1 for making the washer 3 contact the thrust bearing 22, stably. The bearings metals 12 and 22 are supported by a bearing holder 5 which is made of an insulative material. A sealing cap 6, which is for sealing lubricant oil so as not to leak out of the bearing holder 5, is provided on an opening 5a of the bearing holder 5. An oil thrower 7 is provided on another end 1b of the shaft 1 for pushing back the flow of the lubricant oil which is flown from the oilless bearings 12 and 22.

Figure 4:
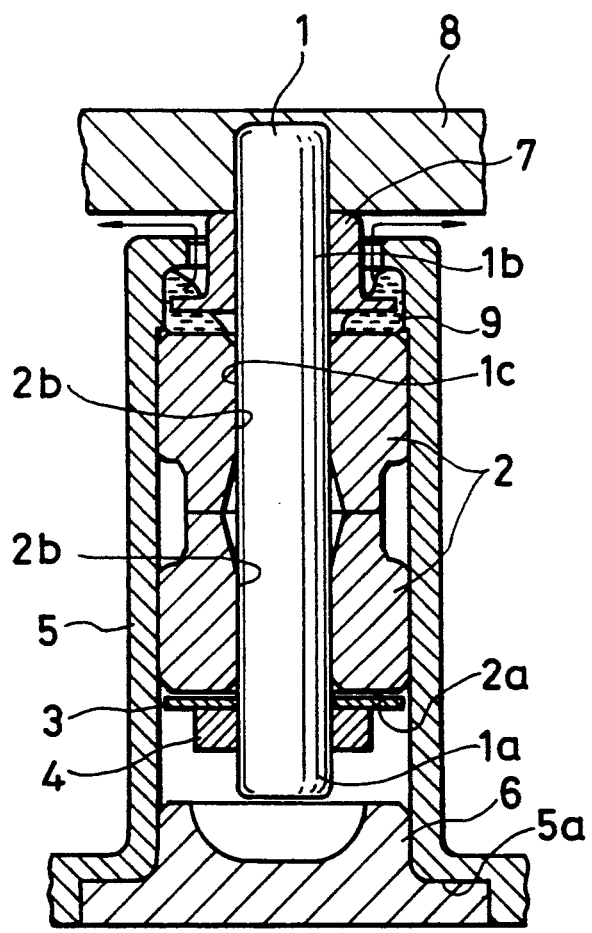
FIG. 4 is the cross-sectional side view showing the conventional bearing apparatus.

In this embodiment, as shown in FIG. 2, at least the oilless bearings(s) 12 (and 22) is (are) different from the conventional bearings 2 shown in FIG. 4 in a point that the oilless bearings(s) 12 (and 22) in accordance with the present invention has (have) plural grooves on the outer surface(s) 12c (and 22c) of the oilless bearing(s) 12 (and 22) for holding the lubricant oil impregnated in the oilless bearing(s) 12 (and 22).

When the shaft 1 is rotated, outer surface 1c of the shaft 1 slides on the inner bearing surfaces 12a and 22a of the oilless bearings 12 and 22. Temperature of the oilless bearings 12 and 22 are increased by friction heat due to the sliding of the shaft 1 on the oilless bearings 12 and 22. The lubricant oil impregnated in the oilless bearings 12 and 22 is expanded and the viscosity of the lubricant oil is decreased by the friction heat. The lubricant oil gushes on the inner bearing surfaces 12a and 22a of the oilless bearings 12 and 22. The overflowed lubricant oil 9 is held by the grooves 12d and 22d made on outer peripheries of the oilless bearings 12 and 22, respectively, shown in FIG. 2. Since, the lubricant oil 9 is held in the grooves 12d and 22d by the surface tension of the oil, it hardly leaks to outside of the bearing holder 5.

Figure 3:
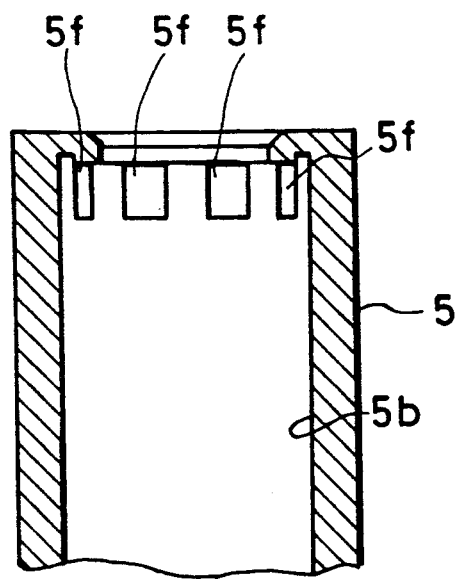
FIG. 3 is a perspective view showing a bearing holder having plural grooves on its inner surface in a second embodiment of the bearing apparatus in accordance with the present invention.

Another preferred embodiment of the bearing apparatus in accordance with the present invention is described referring to FIG. 3, which is a partial sectional view of the bearing holder 5. In FIG. 3, plural grooves or cavities 5f are provided on the inner surface 5b of the bearing holder 5. The lubricant oil, which is overflowed from the oilless bearing 12, is held by the grooves or cavities 5f of the bearing holder 5. Furthermore, the overflowed lubricant oil is effectively pushed back of the oilless bearing 12 by the oil thrower 7 (which is configured in the same manner to that of FIG. 1 but is not shown in FIG. 3).

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A bearing apparatus comprising:
   a rotation shaft of a rotor;
   a cylindrical bearing holder made of insulative material;
   at least one oilless bearing for bearing said rotation shaft, having plural grooves on outer periphery in a direction parallel to the rotation shaft for holding lubricant oil impregnated in the oilless bearing by surface tension;
   an oil thrower mounted on said rotation shaft facing to said rotor; and
   a sealing cap closely fixed on an opening of said bearing holder which is opposite to said oil thrower for sealing said lubricant oil in a manner not to leak out from said bearing holder.

2. A bearing apparatus comprising:
   a rotation shaft of a rotor;
   a cylindrical bearing holder made of insulative material and having plural grooves or cavities on its inner surface for holding lubricant oil by surface tension;
   and oilless bearing for bearing said rotation shaft;
   an oil thrower provided on said rotation shaft facing to said rotor; and
   a sealing cap closely fixed on an opening of said bearing holder opposite to said oil thrower for sealing said lubricant oil so as not to leak out from said bearing holder.

* * * * *